United States Patent
Ferlitsch

(10) Patent No.: US 8,319,988 B2
(45) Date of Patent: Nov. 27, 2012

(54) JOB AUDITING SYSTEMS AND METHODS FOR DIRECT IMAGING OF DOCUMENTS

(75) Inventor: Andrew R. Ferlitsch, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1389 days.

(21) Appl. No.: 11/565,220

(22) Filed: Nov. 30, 2006

(65) Prior Publication Data

US 2008/0133560 A1    Jun. 5, 2008

(51) Int. Cl.
*G06F 3/12* (2006.01)
*G06F 15/00* (2006.01)

(52) U.S. Cl. ............ 358/1.15; 358/1.16; 358/1.14; 358/1.13; 707/239

(58) Field of Classification Search ............ None
See application file for complete search history.

(56) References Cited

U.S. PATENT DOCUMENTS

| | | | |
|---|---|---|---|
| 5,642,199 A | 6/1997 | Ukai et al. | |
| 5,737,599 A * | 4/1998 | Rowe et al. | ................ 1/1 |
| 5,771,101 A | 6/1998 | Bramall | |
| 5,838,461 A | 11/1998 | Hsieh | |
| 6,138,119 A | 10/2000 | Hall et al. | |
| 6,188,766 B1 | 2/2001 | Kocher | |
| 6,538,760 B1 * | 3/2003 | deBry et al. | ........... 358/1.15 |
| 6,592,629 B1 | 7/2003 | Cullen et al. | |
| 7,454,697 B2 * | 11/2008 | Kremer et al. | ........... 715/251 |
| 2002/0181006 A1 | 12/2002 | Chrisop et al. | |
| 2003/0179412 A1 * | 9/2003 | Matsunoshita | ........... 358/3.28 |
| 2004/0179236 A1 | 9/2004 | Ferlitsch et al. | |
| 2004/0263891 A1 | 12/2004 | Yamada et al. | |
| 2005/0097061 A1 | 5/2005 | Shapiro et al. | |
| 2006/0010148 A1 * | 1/2006 | Sattler et al. | ............ 707/101 |
| 2006/0023236 A1 * | 2/2006 | Sievert et al. | ........... 358/1.12 |
| 2006/0085442 A1 * | 4/2006 | Fujiwara | ............ 707/100 |
| 2006/0126114 A1 * | 6/2006 | Choi et al. | ........... 358/1.15 |
| 2006/0232814 A1 * | 10/2006 | Shao et al. | ........... 358/1.15 |
| 2006/0256358 A1 * | 11/2006 | Chapman et al. | ........... 358/1.13 |

FOREIGN PATENT DOCUMENTS

| | | |
|---|---|---|
| EP | 1528455 | 5/2005 |
| GB | 2292036 | 2/1996 |
| WO | 9858335 | 12/1998 |

OTHER PUBLICATIONS

Adobe Acrobat http://replay.web.archive.org/20060901213828/http://itc.gsu.edu/tutorials/Adobe_Acrobat_6.pdf (Sep. 1, 2006).*

* cited by examiner

*Primary Examiner* — Marivelisse Santiago Cordero
*Assistant Examiner* — Huo Long Chen
(74) *Attorney, Agent, or Firm* — Austin Rapp & Hardman

(57) ABSTRACT

A document that corresponds to an imaging job to be performed by an imaging device may be received. The document may be in a non-native format that is not native to the imaging device. It may be determined that a translation operation should be performed on the document. The translation operation may include translating the document from the non-native format into a native format that is native to the imaging device. At least one job auditing function may be performed with respect to the document in the non-native format. Audit data may be generated as a result of the at least one job auditing function being performed. The audit data may be provided to a job auditing record manager. The job auditing record manager may store the audit data in a job auditing record.

21 Claims, 9 Drawing Sheets

JOB AUDITING SYSTEMS AND METHODS FOR DIRECT IMAGING OF DOCUMENTS

TECHNICAL FIELD

The present disclosure relates generally to computers and computer-related technology. More specifically, the present disclosure relates to imaging devices and document imaging.

BACKGROUND

"Imaging," as the term is used herein, refers to one or more of the processes involved in the display and/or printing of graphics and/or text. The term "imaging device," as used herein, refers to any electronic device that provides functionality related to imaging. Some examples of imaging devices include printers, copiers, scanners, facsimile devices, document servers, image servers, electronic whiteboards, digital cameras, digital projection systems, medical imaging devices, and so forth.

For various reasons, an imaging device may be logically connected to (i.e., placed in electronic communication with) one or more computer systems, which may be referred to as host computer systems (or simply as hosts). For example, a printer may be connected to a network of computer systems. This allows the users of the various computer systems on the network to use the printer.

From time to time, an imaging device may receive one or more jobs from a host. The term "imaging job" may refer to an imaging-related task that is performed by an imaging device. For example, a print job may be a single document or a set of documents that is submitted to a printer for printing.

To facilitate communication between a host and an imaging device, the host may include a driver for the imaging device. The driver for a particular imaging device may allow applications on the host to be able to communicate with the imaging device without knowing specific details about the imaging device's hardware and internal language.

Some products may allow the direct imaging of documents. In this context, the term "direct imaging" refers to the imaging of a document, where the imaging job is initiated by a device that does not include the application that created the document and/or the imaging device driver. A direct imaging job may be initiated from a host computing device. Alternatively, a user may initiate a direct imaging job at the imaging device itself (e.g., via a communication interface, such as a USB port). This type of imaging job may be referred to as a "walk-up" job. In either case, the document data may be re-routed to a translation service (which does have the application and conversion driver) that may then convert the document into a format that the imaging device expects to receive.

Under some circumstances it may be desirable to perform one or more job auditing functions with respect to imaging jobs that are performed on an imaging device. Such job auditing functions may involve extracting from an imaging job a small quantity of text and/or image data that would enable a reviewing party to understand the content of the document that is being imaged. The extracted data may be stored in a job auditing record for review.

As mentioned, the present disclosure relates to imaging devices and document imaging. More specifically, the present disclosure relates to job auditing systems and methods for direct imaging of documents.

DETAILED DESCRIPTION

Figure 1:
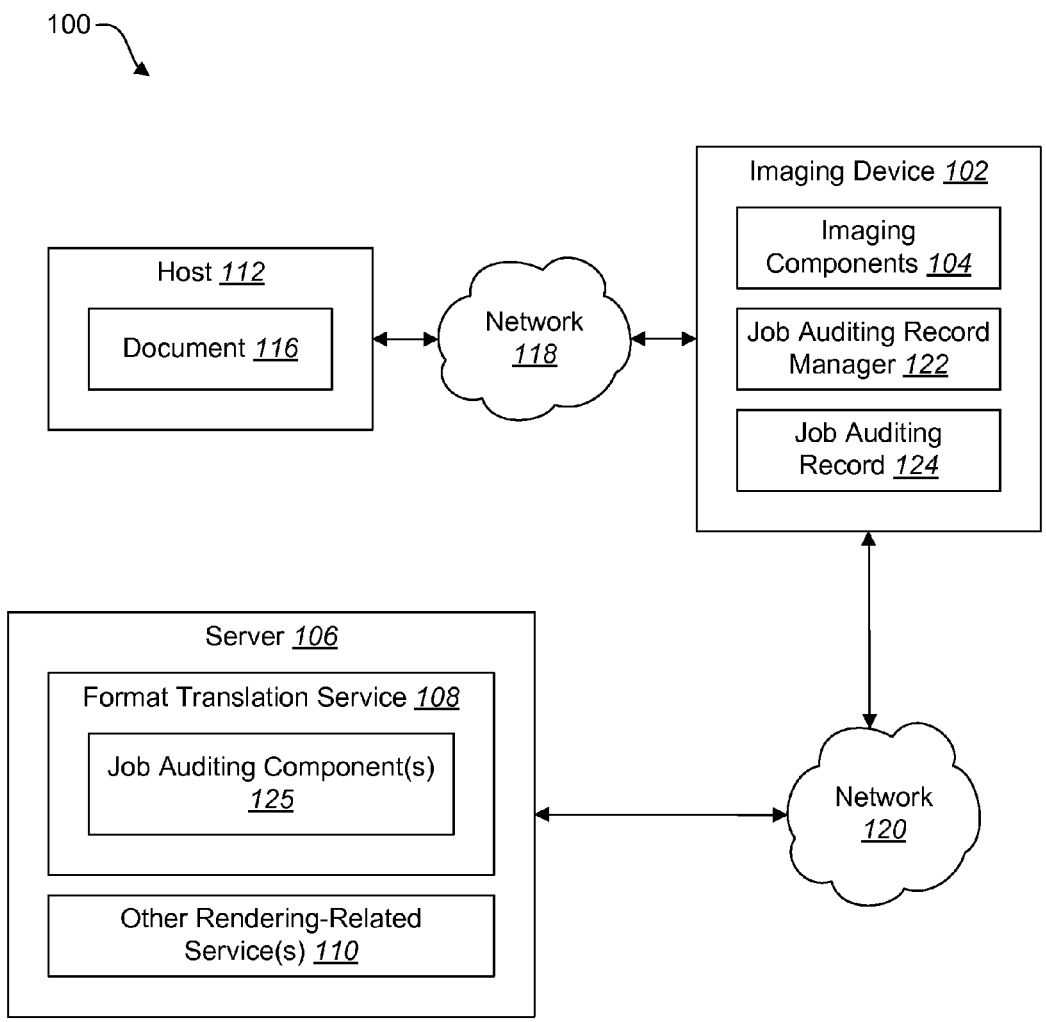
FIG. 1 illustrates a job auditing system for direct imaging of documents in accordance with an embodiment.

A job auditing method for direct imaging of documents is disclosed. The method may involve receiving a document that corresponds to an imaging job to be performed by an imaging device. The document may be in a non-native format that is not native to the imaging device. The method may also involve determining that a translation operation should be performed on the document. The translation operation may involve translating the document from the non-native format into a native format that is native to the imaging device. The method may also involve performing at least one job auditing function with respect to the document in the non-native format. Audit data may be generated as a result of the at least one job auditing function being performed. The method may also involve providing the audit data to a job auditing record manager. The job auditing record manager may store the audit data in a job auditing record.

Performing the at least one job auditing function may involve creating a thinned, linearized version of the document. The thinned, linearized version of the document may be in the non-native format. Creating the thinned, linearized version of the document may involve creating a linearized version of the document, extracting a subset of pages from the linearized document, and reducing content within the pages that are extracted. Performing the at least one job auditing function may also involve extracting metadata associated with the document and including the metadata in the thinned, linearized version of the document. The audit data that is generated may include the thinned, linearized version of the document.

The method may be implemented by a format translation service. In this situation, determining that the translation operation should be performed may involve receiving a request from the imaging device to translate the document from the non-native format to the native format. Alternatively, the method may be implemented by an imaging/translation server.

The job auditing record manager may be located on the imaging device. Alternatively, where the method is implemented by a format translation service, the job auditing record manager may be part of the format translation service. Alternatively, the job auditing record manager may be separate from the imaging device and also separate from the format translation service.

The job auditing record may be located on the imaging device. Alternatively, the job auditing record may be located in storage that is separate from but accessible to the imaging device.

The method may also involve translating the document from the non-native format into the native format, thereby obtaining a translated version of the document. The method may also involve sending the translated version of the document to the imaging device for further processing.

The imaging job may be initiated at a host that is in electronic communication with the imaging device. Alternatively, the imaging job may be initiated at the imaging device. Alternatively, the imaging device may be a multi-function peripheral device.

A computer system that is configured to implement a job auditing method for direct imaging of documents is also disclosed. The computer system includes a processor and memory in electronic communication with the processor. The instructions are executable to receive a document that corresponds to an imaging job to be performed by an imaging device. The document may be in a non-native format that is not native to the imaging device. The instructions are also executable to determine that a translation operation should be performed on the document. The instructions are also executable to translate the document from the non-native format into a native format that is native to the imaging device. The instructions are also executable to perform at least one job auditing function with respect to the document in the non-native format. Audit data may be generated as a result of the at least one job auditing function being performed. The instructions are also executable to provide the audit data to a job auditing record manager. The job auditing record manager may store the audit data in a job auditing record.

A computer-readable medium is also disclosed. The computer-readable medium may include executable instructions for receiving a document that corresponds to an imaging job to be performed by an imaging device. The document may be in a non-native format that is not native to the imaging device. The computer-readable medium may also include executable instructions for determining that a translation operation should be performed on the document. The translation operation may involve translating the document from the non-native format into a native format that is native to the imaging device. The computer-readable medium may also include executable instructions for performing at least one job auditing function with respect to the document in the non-native format. Audit data may be generated as a result of the at least one job auditing function being performed. The computer-readable medium may also include executable instructions for providing the audit data to a job auditing record manager. The job auditing record manager may store the audit data in a job auditing record.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions, and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

FIG. 1 illustrates a job auditing system 100 for direct imaging of documents in accordance with an embodiment. The system 100 includes an imaging device 102. The imaging device 102 may include one or more imaging components 104. The imaging components 104 may perform one or more imaging-related functions. Some examples of imaging devices 102 include printers, copiers, scanners, facsimile devices, document servers, image servers, electronic whiteboards, digital cameras, digital projection systems, medical imaging devices, and so forth. Some examples of imaging-related functions that may be performed by the imaging components 104 include printing, copying, scanning, image file creation and/or manipulation, faxing, file/document conversion, publishing, displaying, etc.

As mentioned above, the term "imaging job" may refer to an imaging-related task that is performed by the imaging device 102. The imaging-related task may be performed with respect to a document 116. The system 100 shown in FIG. 1 may facilitate the direct imaging of documents. In the context of FIG. 1, the term "direct imaging" may refer to the imaging of a document 116, where the imaging job is initiated by a device that does not include the application that created the document 116 and/or a driver for the imaging device 102. The direct imaging of a document 116 may be initiated by a host computing device 112. Alternatively, the direct imaging of a document 116 may be initiated at the imaging device 102 itself (e.g., via a communication interface, such as a USB port). This type of imaging job may be referred to as a "walk-up" job.

The input for an imaging job may be a softcopy, and the output may be a hardcopy. Alternatively, or in addition, the output of the imaging operation may be a softcopy (e.g., a fax operation, file creation, etc.).

In FIG. 1, the host 112 is shown in electronic communication with the imaging device 102 via a first network 118, and the imaging device 102 is shown in electronic communication with the server 106 via a second network 120. The networks 118, 120 may be wired and/or wireless. Although a first network 118 and a second network 120 are shown in FIG. 1, the host 112, the imaging device 102 and the server 106 may be connected and may communicate with each other by any suitable means. For example, the host 112, the imaging device 102 and the server 106 may be in electronic communication with one another via the same network. Alternatively, the host 112 may be directly connected to the imaging device 102, and/or the imaging device 102 may be directly connected to the server 106. Other configurations are also possible. Communication between the host 112, the imaging device 102 and the server 106 may occur in accordance with any suitable protocol, such as TCP/IP, HTTP/HTML, SOAP/XML, etc.

The imaging device 102 may take as input both formats that are native to the imaging device 102 (e.g., formats that can be processed wholly within the imaging device 102) and non-native formats (e.g., formats that cannot be processed wholly within the imaging device 102). Some examples of formats that may be native to the imaging device 102 include page description languages (PDLs) (e.g., PCL, Postscript, etc.), image formats (e.g., TIFF, JPEG), graphics languages (e.g., XPS, SVG), etc. Some examples of formats that may not be native to the imaging device 102 include document formats, such as Microsoft Office®, Open Office, Adobe® PDF, etc.

The system 100 includes a server 106, which includes a format translation service 108. The format translation service 108 may be configured to translate documents from a format that is not native to the imaging device 102 into a format that is native to the imaging device 102.

The server 106 may also include other rendering-related services 110. Some examples of functionality that may be implemented by the other rendering-related service(s) 110 may include optical character recognition (OCR), Bates stamping, bar code processing, storage, image enhancement, compression, encryption, watermarks, indexing/filing, etc.

The system 100 may include a job auditing record manager 122. The job auditing record manager 122 may store auditing information about imaging jobs that are performed by the imaging device 102 in a job auditing record 124. The job auditing record 124 may include the following information about an imaging job: the job owner, the date/time of the imaging job, the job type and characteristics of the imaging job, the consumables used, a thinned or reduced version of the data printed, etc.

In FIG. 1, the job auditing record manager 122 is shown on the imaging device 102. Alternatively, the job auditing record manager 122 may be part of the format translation service 108, or it may be separate from the format translation service 108 but still located on the server 106. Alternatively still, the job auditing record manager 122 may be located on another system that is separate from both the imaging device 102 and the server 106.

In FIG. 1, the job auditing record 124 is shown on the imaging device 102. Alternatively, the job auditing record 124 may be stored in offline storage that is accessible to the imaging device 102. The job auditing record 124 may be encrypted, compressed, and/or have access controls.

The format translation service 108 may include one or more components 125 that implement one or more job auditing functions. The job auditing function(s) performed by the job auditing component(s) 125 of the format translation service 108 may generate audit data. The job auditing record manager 122 may store the audit data in the job auditing record 124. The operation of the job auditing component(s) 125 of the format translation service 108 will be described in greater detail below.

Figure 2:
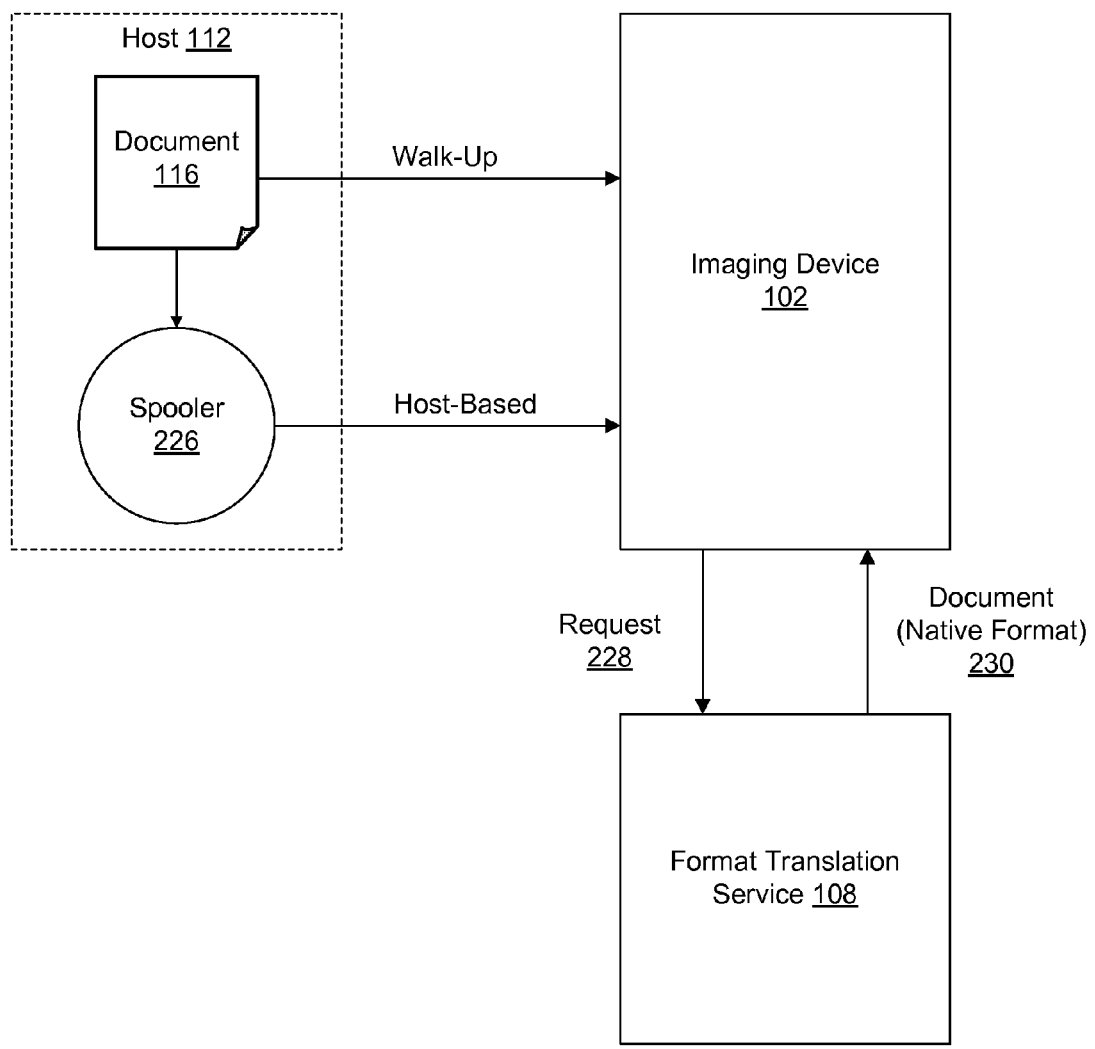
FIG. 2 illustrates some aspects of the operation of some of the components in the job auditing system of FIG. 1.

Referring now to FIG. 2, suppose that an imaging job is initiated with respect to a document 116 that is in a non-native format. As mentioned above, such an imaging job may be initiated from the host 112. A spooler 226 on the host 112 may send the imaging job data to the imaging device 102. Alternatively, such an imaging job may be initiated at the imaging device 102, as a "walk-up" job. In this scenario, the imaging job data may be transmitted to the imaging device 102 via a communication interface (e.g., a USB interface) on the imaging device 102.

When the imaging device 102 receives a document 116 that is in a non-native format, the imaging device 102 may send a request 228 to the format translation service 108 to translate the document 116 from the non-native format to a native format. The format translation service 108 may send the translated document 230 (i.e., the document 116 translated into a native format) back to the imaging device 102. The document 230 in the native format may then be processed by the imaging device 102.

The request 228 that is sent from the imaging device 102 to the format translation service 108 may include information about the user that initiated the imaging job. This information may be included in the request 228 for authentication purposes. The transmission of the request 228 may be secured or unsecured. Examples of methods/protocols for transmitting the service request 228 include web service protocols (e.g., SOAP/XML), TCP/IP, AppleTalk, HTML/HTTP, etc.

The imaging device 102 may locate the format translation service 108 by any suitable means. For example, the address of the format translation service 108 may be predefined in the imaging device 102, i.e., entered into the imaging device 102 by an administrator. The address of the format translation service 108 may be entered via an interface that is part of the imaging device 102 itself, or via a remote interface. Alternatively, the address of the format translation service 108 may be loaded onto the imaging device 102 using a service profile. As another example, the address of the format translation service 108 may be dynamically entered by the user, as part of initiating the imaging job. As another example, the address of the format translation service 108 may be registered in the imaging device 102 by the service 108. The service 108 may statically register itself with the imaging device 102. Alternatively, the service 108 may dynamically register itself with the imaging device 102 (e.g., the service 108 may broadcast its service availability). As another example, the address of the format translation service 108 may be dynamically discovered by the imaging device 102. The imaging device 102 may discover the format translation service 108 by broadcasting or multicasting a request. Alternatively, the imaging device 102 may discover the format translation service 108 by polling or otherwise enumerating through a list of predefined communication addresses.

Figure 3:
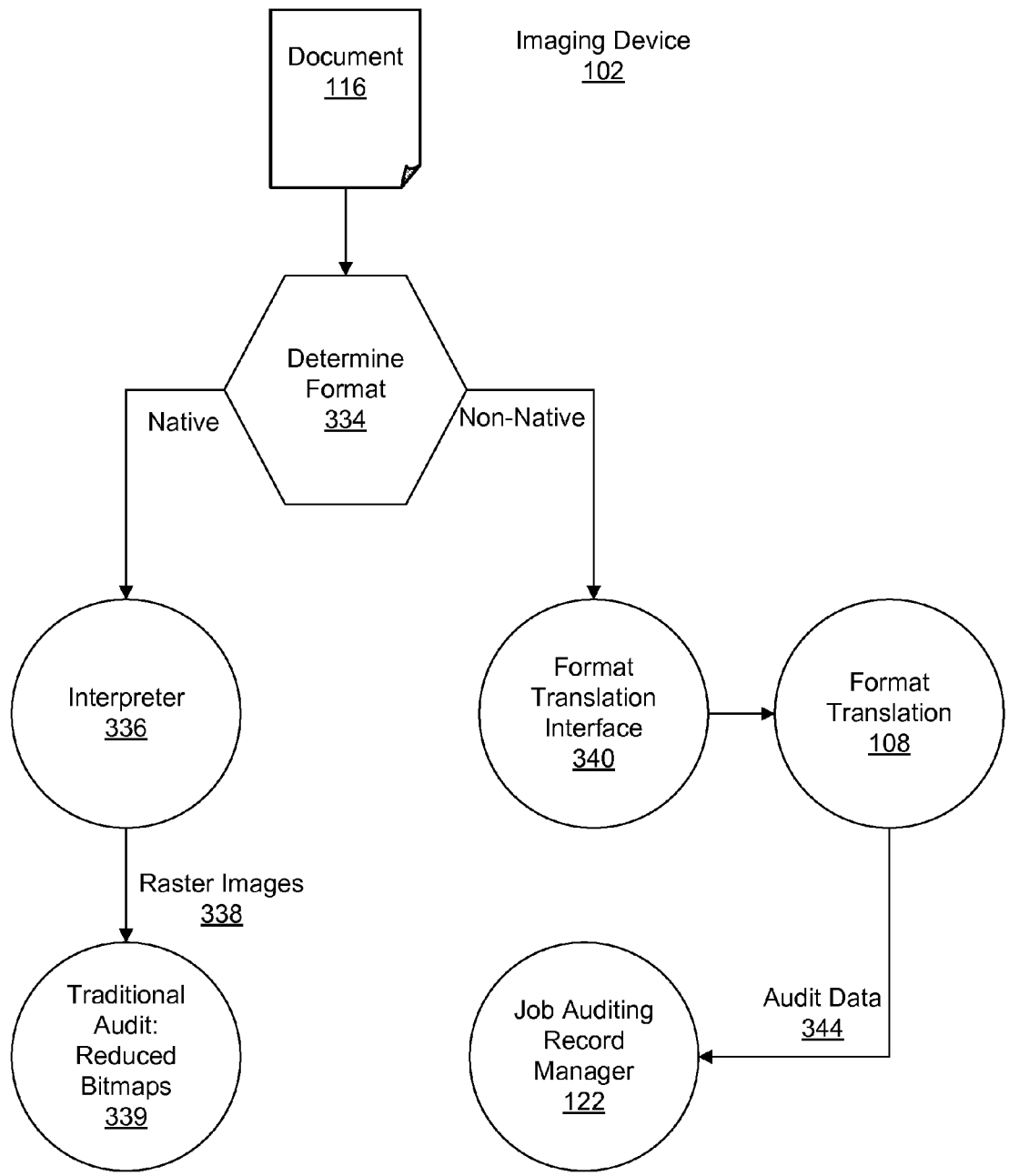
FIG. 3 illustrates some additional aspects of the operation of some of the components in the job auditing system of FIG. 1.

As mentioned above, an imaging job may be an imaging-related task that is performed with respect to a document 116. Referring now to FIG. 3, when an imaging job is received by the imaging device 102, the imaging device 102 may perform a format check to determine the format type of the corresponding document 116. The component 334 that performs this format check may be referred to as a "sniffer." The format of the document 116 may be determined by any suitable means. For example, the document 116 may be parsed for a format signature. As another example, the imaging job request may explicitly specify the format of the document 116. As another example, the format of the document 116 may be inferred from other information in the document 116 (e.g., a file suffix).

If it is determined that the document 116 is in a native format, the document 116 may be provided to an interpreter 336 (e.g., a PDL interpreter), which may convert the document 116 into raster images 338. The document 116 may already be in raster image format 338, in which case it may not be necessary to provide the document 116 to the interpreter 336. A job auditing component 339 may then perform job auditing in a traditional manner. This may include recording a reduced/thinned image version of the raster page images 338 in the job auditing record 124. The job auditing component 339 may be located within the imaging device 102. Alternatively, the job auditing component 339 may be external to the imaging device 102 (e.g., an external web service).

If it is determined that the document 116 is in an image format that is native to the imaging device 102, the job auditing component 339 may perform job auditing in the traditional manner, as described above, but with one or more additional steps. For example, any metadata information (e.g., TIFF tag entries) associated with the image data as a whole and the metadata information associated with individual images that are part of the audit record 124 may be stored with the audit record 124. In addition, the thinned or reduced image record may include a reconstructed document in the original image format, which may include some subset of page images and associated metadata. The thinned image data may be further secured by encryption. The thinned image data may be reduced, such as by reduction in resolution, filtering of certain graphical types, compression, etc.

It may be determined that the document 116 is in a non-native format, such as a document format. In this case, the imaging device 102 may send the document 116 to the format translation service 108 via a format translation interface 340. As mentioned above, the format translation service 108 may translate the document 116 into a format that is native to the imaging device 102. The format translation service 108 may send the translated document 230 (i.e., the document 116 translated into a native format) back to the imaging device 102. The document 230 in the native format may then be processed by the imaging device 102.

In addition, the format translation component(s) 125 within the format translation service 108 may also generate audit data 344. The audit data 344 may include the thinned document for the job auditing record 124. The format translation service 108 may send the audit data 344 to the job auditing record manager 122. The job auditing record manager 122 may store the audit data 344 in the job auditing record 124. As indicated above, the job auditing record manager 122 may be located on the imaging device 102. Alternatively, the job auditing record manager 122 may be part of the format translation service 108, or it may be separate from the format translation service 108 but still located on the server 106. Alternatively still, the job auditing record manager 122 may be located on another system that is separate from the imaging device 102 and the server 106.

Figure 4:
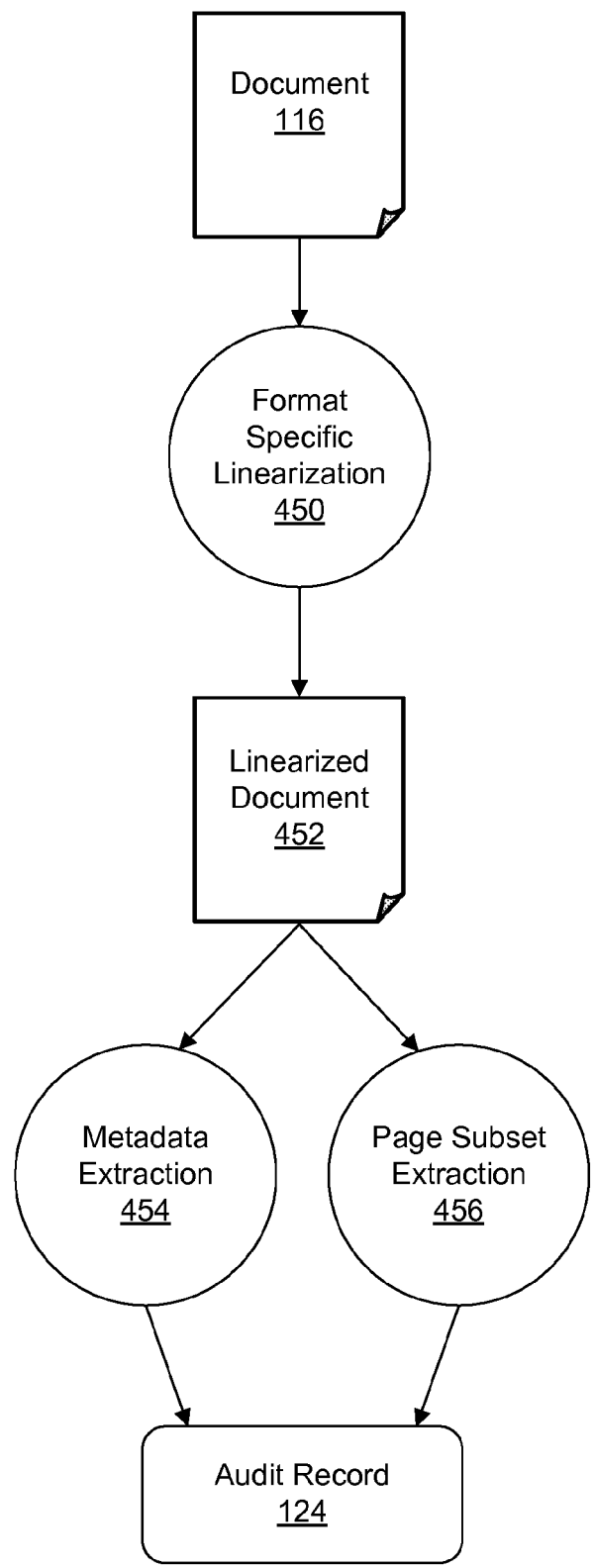
FIG. 4 illustrates some additional aspects of the operation of some of the components in the job auditing system of FIG. 1.

Referring now to FIG. 4, when the format translation service 108 receives a document 116 for translation into a native format, one or more components 125 within the format translation service 108 may perform one or more job auditing functions. For example, the format translation service 108 may include a format specific linearization component 450. The format specific linearization component 450 is one example of a job auditing component 125. The format specific linearization component 450 may linearize the document data (e.g., PDF linearization, TIFF streaming). In other words, this component 450 may reorganize the document data such that the physical location of the page data is in sequential page order. The format specific linearization component 450 may output a linearized document 452.

The format translation service 108 may also include a page subset extraction component 456. The page subset extraction component 456 is another example of a job auditing component 125. The page subset extraction component 456 may extract a subset of pages from the linearized document 452. The page subset extraction component 456 may also "thin" (i.e., reduce) the content of the extracted pages.

The format translation service 108 may also include a metadata extraction component 454. The metadata extraction component 454 is another example of a job auditing component 125. The metadata extraction component 454 may extract the metadata associated with the document 116 as a whole and any metadata associated with the extracted pages. A thinned document may then be reconstructed. The thinned document may include the subset of linearized extracted pages as well as metadata. The thinned document may be in the original document format. The thinned document may be stored in the job auditing record 124.

Figure 5:
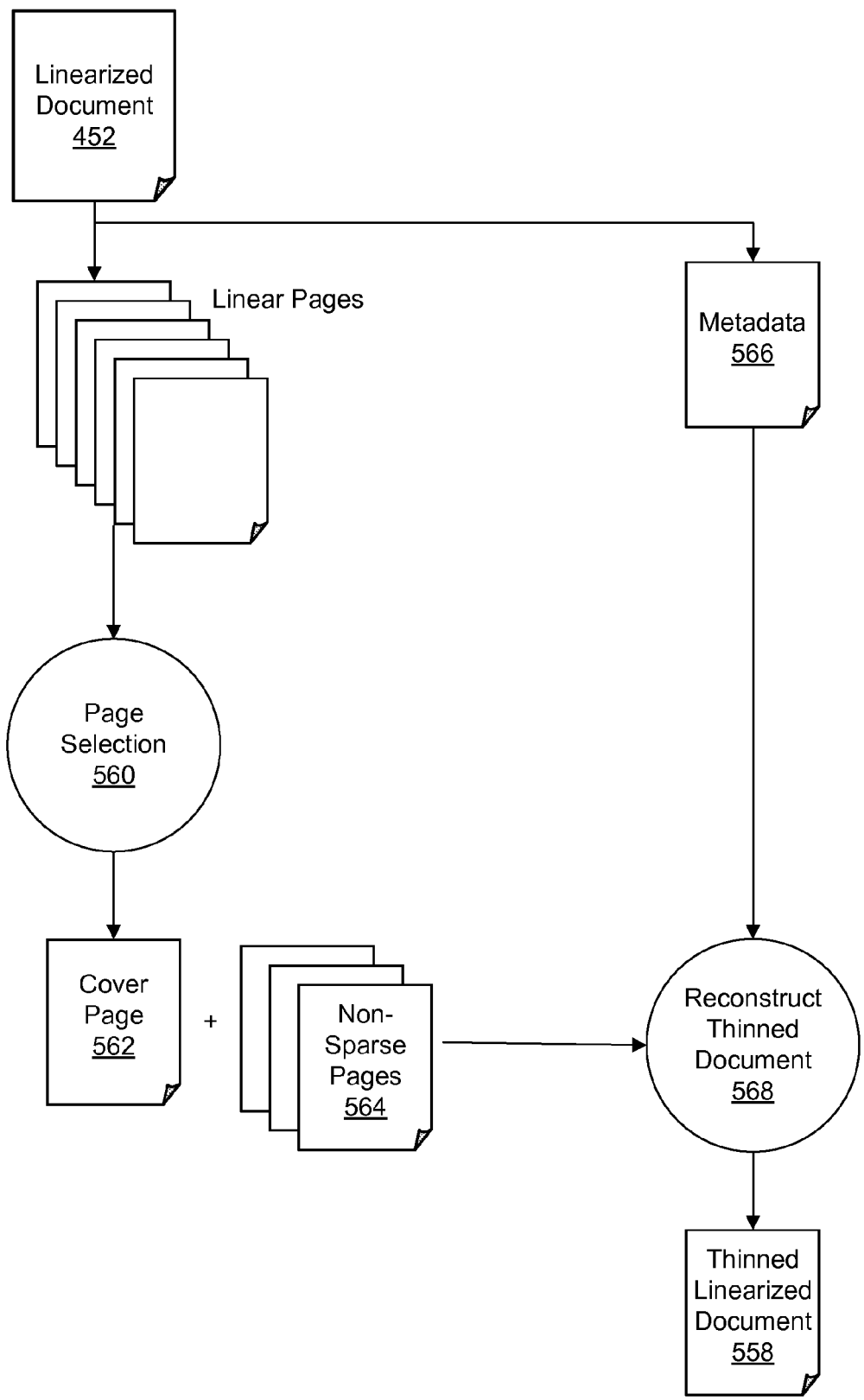
FIG. 5 illustrates some additional aspects of the operation of some of the components in the job auditing system of FIG. 1.

Referring now to FIG. 5, the page subset extraction component 456 within the format translation service 108 may use any suitable method to select a subset of pages from the linearized document 452 to be part of the thinned document 558 that may be stored in the job auditing record 124. For example, a page selection component 560 may select the first (cover) page 562. Alternatively, or in addition, the page selection component 560 may select a fixed number of non-sparse pages 564. There are a variety of ways to determine what constitutes a sparse page, such as whether the page is blank, the amount of text below a threshold (where the page only includes text), whether the amount of sheet surface covered is below a threshold, whether the number of sheet partitions (i.e., the sheet divided into equally sized rectangular areas) that include content is below a threshold, etc. Alternatively still, the page subset component 560 may select a fixed number of initial pages.

The subset of linearized pages (as selected by the page selection component 560) and the extracted metadata 566 may be provided to a component 568 that performs the function of reconstructing the thinned document 558. The thinned document 558 may be stored in the job auditing record 124.

Figure 6:
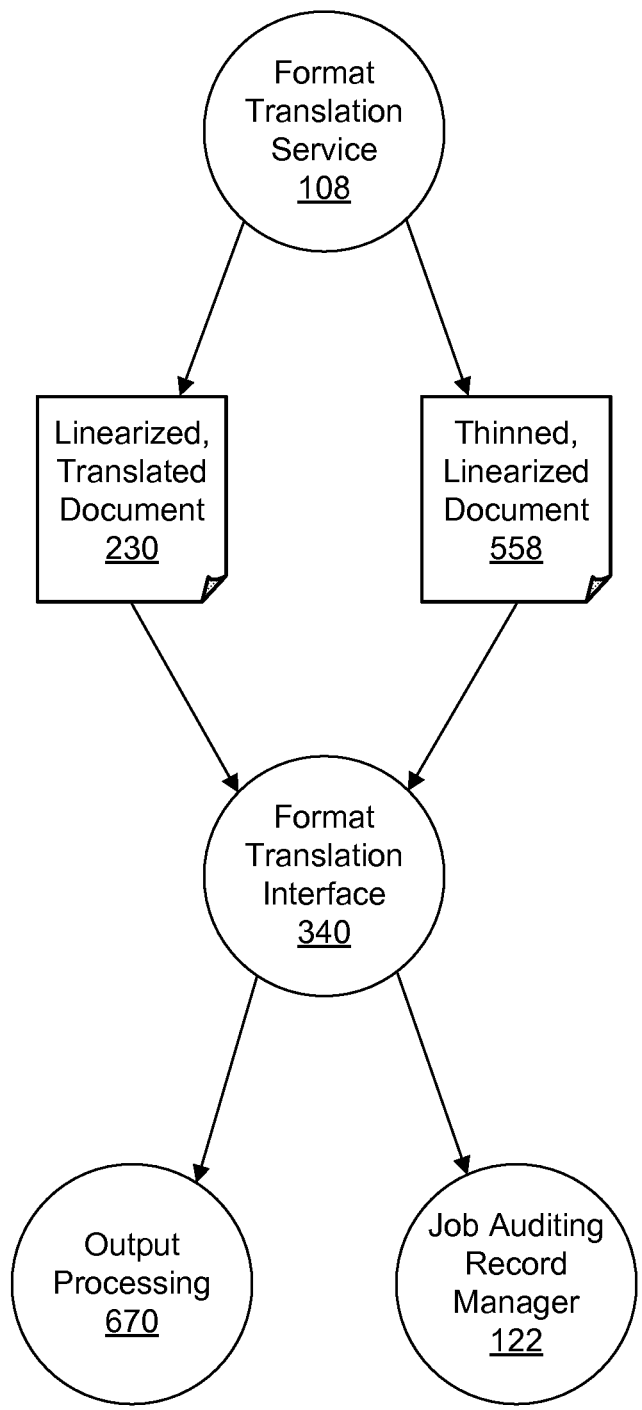
FIG. 6 illustrates some additional aspects of the operation of some of the components in the job auditing system of FIG. 1.

Referring now to FIG. 6, when the format translation service 108 completes the format translation of the document 116 to a format that is native to (e.g., compatible with) the imaging device 102, it may send the linearized, translated document 230 back to the imaging device 102 via the format translation interface 340. The linearized, translated document 230 may then be provided to an output processing component 670 for additional processing.

In some situations, the original document 116 may already be native to the imaging device 102. In such situations, the document that is sent back to the imaging device 102 may be linearized but not translated.

The format translation service 108 may send the thinned, linearized document 558 to the job auditing record manager 122. As mentioned above, the job auditing record manager 122 may be located on the imaging device 102. In this situation, the format translation service 108 may send the thinned, linearized document 558 to the imaging device 102 via the format translation interface 340. The job auditing record manager 122 may store the thinned, linearized document 558 as part of the job auditing record 124. The thinned, linearized document 558 may be further protected, such as by the use of encryption and/or access control.

Alternatively, the job auditing record manager 122 may be part of the format translation service 108. In this situation, the format translation service 108 may itself store the thinned, linearized document 558 in the job auditing record 124. Alternatively, the job auditing record manager 122 may be external to the imaging device 102 and the format translation service 108. In this situation, the format translation service 108 may send the thinned, linearized document 558 to this external component 122.

Figure 7:
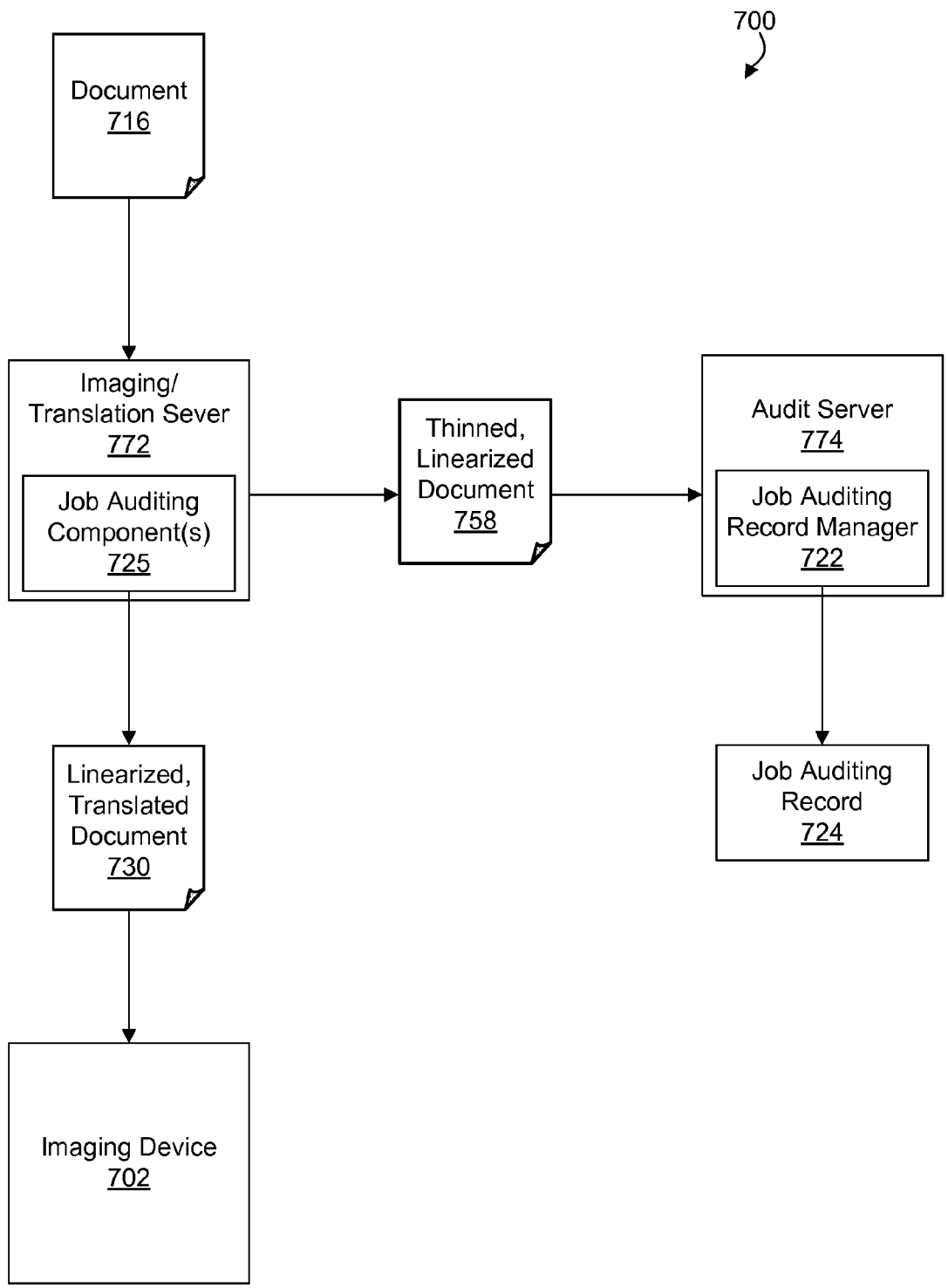
FIG. 7 illustrates a job auditing system for direct imaging of documents in accordance with another embodiment.

FIG. 7 illustrates another job auditing system 700 for direct imaging of documents. In this system 700, a document 716 may be sent to a network imaging queue, which is illustrated in FIG. 7 as an imaging/translation server 772. The imaging/translation server 772 may include one or more components 725 that perform one or more job auditing functions. The job auditing functions performed by the job auditing components 725 may be similar to the job auditing functions that were described above in relation to the job auditing components 125 in the system 100 of FIG. 1. For example, the job auditing components 725 may create a thinned, linearized document 758, which may be sent to an audit server 774. A job auditing record manager 722 on the audit server 774 may store the thinned, linearized document 758 in a job auditing record 724. The imaging/translation server 772 may also create a linearized, translated document 730 that may be sent to an imaging device 702 for processing.

Figure 8:
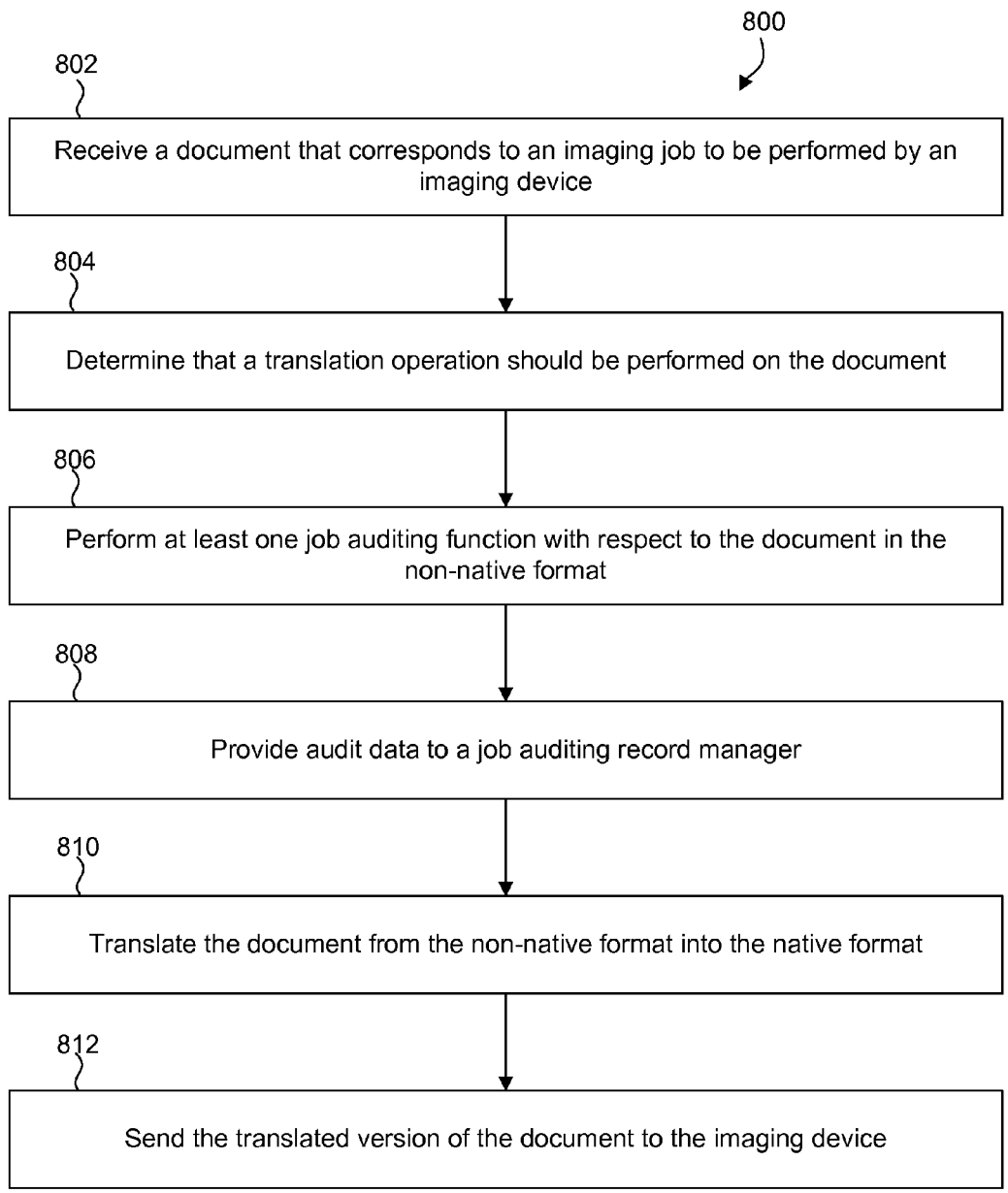
FIG. 8 illustrates a job auditing method for direct imaging of documents in accordance with an embodiment.

FIG. 8 illustrates a job auditing method 800 for direct imaging of documents. The method 800 involves receiving 802 a document that corresponds to an imaging job to be performed by an imaging device. The method 800 also involves determining 804 that a translation operation should be performed on the document that is received. The method 800 also involves performing 806 at least one job auditing function with respect to the document in the non-native format. The method 800 also involves providing 808 audit data to a job auditing record manager. The method 800 also involves translating 810 the document from the non-native format into the native format. The method 800 also involves sending 812 the translated version of the document to the imaging device.

The method 800 may be implemented by the format translation service 108 in the system 100 of FIG. 1. The format translation service 108 may receive 802 a document 116 as part of a request 228 from the imaging device 102 to translate the document 116 from a non-native format to a native format. The format translation service 108 may determine 804 that a translation operation should be performed on the document 116 by processing the request 228 from the imaging device 102. The job auditing component(s) 125 of the format translation service 108 may perform 806 a job auditing function by creating a thinned, linearized version 558 of the document 116. The thinned, linearized version 558 of the document 116 may be in the non-native format. The job auditing component(s) 125 may also perform 806 a job auditing function by extracting metadata 566 associated with the document 116. The metadata 566 may be included in the thinned, linearized version 558 of the document 116. The job auditing component(s) 125 of the format translation service 108 may provide 808 audit data 344 to the job auditing record manager 122. The audit data 344 may include the thinned, linearized version 558 of the original document 116. The format translation service 108 may translate 810 the document 116 that it receives from the imaging device 102 from a format that is non-native with respect to the imaging device 102 into a format that is native with respect to the imaging device 102. The format translation service 108 may send 812 the translated version 230 of the document 116 to the imaging device 102.

The method 800 may be implemented by the imaging/translation server 772 in the system 700 of FIG. 7. The imaging/translation server 772 may receive 802 a document 716 from a host computing device before the document 716 is provided to the imaging device 702. The imaging/translation server 772 may determine 804 that a translation operation should be performed on the document 716 by analyzing the document 716 and determining that the document 716 is in a format that is not native to the imaging device 702. The job auditing component(s) 725 of the imaging/translation server 772 may perform 806 a job auditing function by creating a thinned, linearized version 758 of the document 716. The thinned, linearized version 758 of the document 716 may be in the non-native format. The job auditing component(s) 725 of the imaging/translation server 772 may provide 808 audit data (e.g., the thinned, linearized version 758 of the document 716) to the job auditing record manager 722. The job auditing component(s) 725 of the imaging/translation server 772 may translate 810 the document 716 from a format that is non-native with respect to the imaging device 702 into a format that is native with respect to the imaging device 702. The imaging/translation server 772 may send 812 the translated version 730 of the document 716 to the imaging device 702.

Figure 9:
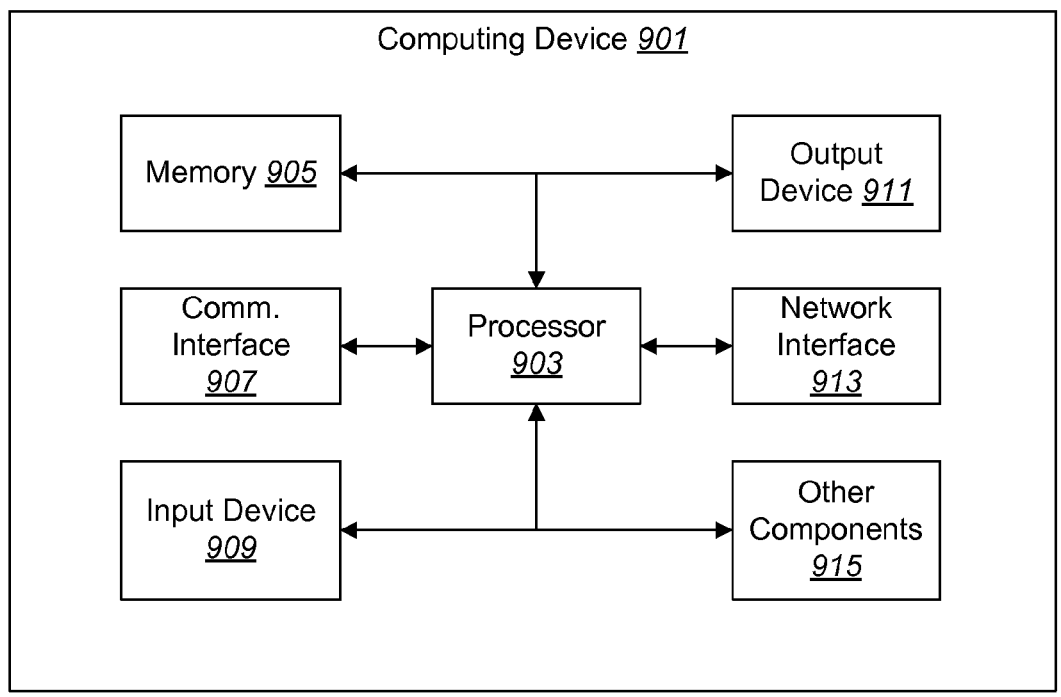
FIG. 9 illustrates various components that may be utilized in a computing device.

FIG. 9 illustrates various components that may be utilized in a computing device 901. In the system 100 of FIG. 1, the host 112, imaging device 102 and server 106 are examples of computing devices 901. In the system 700 of FIG. 7, the imaging/translation server 772, the imaging device 702 and the audit server 774 are examples of computing devices 901. The illustrated components may be located within the same physical structure or in separate housings or structures.

The computing device 901 may include a processor 903 and memory 905. The processor 903 may control the operation of the computing device 901 and may be embodied as a microprocessor, a microcontroller, a digital signal processor (DSP) or other device known in the art. The processor 903 typically performs logical and arithmetic operations based on program instructions stored within the memory 905. The instructions in the memory 905 may be executable to implement the methods discussed above.

The computing device 901 may also include one or more communication interfaces 907 and/or network interfaces 913 for communicating with other electronic devices. The communication interface(s) 907 and the network interface(s) 913 may be based on wired communication technology, wireless communication technology, or both.

The computing device 901 may also include one or more input devices 909 and one or more output devices 911. The input devices 909 and output devices 911 may facilitate user input. Other components 915 may also be provided as part of the computing device 901.

FIG. 9 illustrates only one possible configuration of a computing device 901. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A job auditing method for direct imaging of documents, comprising:
   receiving a document that corresponds to an imaging job to be performed by an imaging device, wherein the document is in a non-native format that is not native to the imaging device;
   determining that a translation operation should be performed on the document, wherein the translation operation comprises translating the document from the non-native format into a native format that is native to the imaging device;
   performing at least one job auditing function with respect to the document in the non-native format, wherein audit data is generated as a result of the at least one job auditing function being performed, wherein performing the at least one job auditing function comprises creating a thinned, linearized version of the document in the non-native format and extracting metadata associated with the document and including the metadata in the thinned, linearized version of the document in the non-native format, wherein the audit data comprises the thinned, linearized version of the document in the non-native format, and wherein creating the thinned, linearized version of the document comprises:
      creating a linearized version of the document by reorganizing the document data such that the physical location of the page data is in sequential page order;
      extracting a subset of pages from the linearized document; and
      reducing content within the pages that are extracted; and
   providing the audit data to a job auditing record manager, wherein the job auditing record manager stores the audit data in a job auditing record.

2. The method of claim 1, wherein the method is implemented by a format translation service, and wherein determining that the translation operation should be performed comprises receiving a request from the imaging device to translate the document from the non-native format to the native format.

3. The method of claim 1, wherein the method is implemented by an imaging/translation server.

4. The method of claim 1, wherein the job auditing record manager is located on the imaging device.

5. The method of claim 1, wherein the job auditing record manager is part of a format translation service.

6. The method of claim 1, wherein the job auditing record manager is separate from the imaging device and also separate from a format translation service.

7. The method of claim 1, wherein the job auditing record is located on the imaging device.

8. The method of claim 1, wherein the job auditing record is located in storage that is separate from but accessible to the imaging device.

9. The method of claim 1, further comprising:
   translating the document from the non-native format into the native format, thereby obtaining a translated version of the document; and
   sending the translated version of the document to the imaging device for further processing.

10. The method of claim 1, wherein the imaging job is initiated at a host that is in electronic communication with the imaging device.

11. The method of claim 1, wherein the imaging job is initiated at the imaging device.

12. The method of claim 1, wherein the imaging device is a multi-function peripheral device.

13. The method of claim 1, wherein extracting a subset of pages from the linearized document comprises selecting a fixed number of non-sparse pages.

14. The method of claim 2, wherein the request from the imaging device to translate the document from the non-native to the native format includes information about a user that initiated the imaging job.

15. The method of claim 14, wherein the request from the imaging device to translate the document from the non-native to the native format is secured.

16. The method of claim 13, wherein selecting a fixed number of non-sparse pages comprises determining if a page is sparse, wherein a page is sparse if an amount of sheet surface covered is below a threshold.

17. The method of claim 16, wherein creating the thinned, linearized version of the document further comprises constructing the thinned, linearized version of the document from the extracted subset of pages and the extracted metadata.

18. The method of claim 17, wherein the extracted metadata associated with the document comprises metadata associated with the document as a whole and metadata associated with the extracted subset of pages.

19. The method of claim 18, wherein the audit data further comprises a job owner, a date and a time of the imaging job, a job type and job characteristics of the imaging job, and consumables used.

20. A computer system that is configured to implement a job auditing method for direct imaging of documents, the computer system comprising:
 a processor;
 memory in electronic communication with the processor;
 instructions stored in the memory, the instructions being executable to:
  receive a document that corresponds to an imaging job to be performed by an imaging device, wherein the document is in a non-native format that is not native to the imaging device;
  determine that a translation operation should be performed on the document, wherein the translation operation comprises translating the document from the non-native format into a native format that is native to the imaging device;
  perform at least one job auditing function with respect to the document in the non-native format, wherein audit data is generated as a result of the at least one job auditing function being performed, wherein performing the at least one job auditing function comprises creating a thinned, linearized version of the document in the non-native format, wherein the audit data comprises the thinned, linearized version of the document in the non-native format, and extracting metadata associated with the document and including the metadata in the thinned, linearized version of the document in the non-native format, and wherein creating the thinned, linearized version of the document comprises:
   creating a linearized version of the document by reorganizing the document data such that the physical location of the page data is in sequential page order;
   extracting a subset of pages from the linearized document; and
   reducing content within the pages that are extracted; and
  provide the audit data to a job auditing record manager, wherein the job auditing record manager stores the audit data in a job auditing record.

21. A non-transitory computer-readable medium comprising executable instructions for:
 receiving a document that corresponds to an imaging job to be performed by an imaging device, wherein the document is in a non-native format that is not native to the imaging device;
 determining that a translation operation should be performed on the document, wherein the translation operation comprises translating the document from the non-native format into a native format that is native to the imaging device;
 performing at least one job auditing function with respect to the document in the non-native format, wherein audit data is generated as a result of the at least one job auditing function being performed, wherein performing the at least one job auditing function comprises creating a thinned, linearized version of the document in the non-native format, wherein the audit data comprises the thinned, linearized version of the document in the non-native format, and extracting metadata associated with the document and including the metadata in the thinned, linearized version of the document in the non-native format, and wherein creating the thinned, linearized version of the document comprises:
  creating a linearized version of the document by reorganizing the document data such that the physical location of the page data is in sequential page order;
  extracting a subset of pages from the linearized document; and
  reducing content within the pages that are extracted; and
 providing the audit data to a job auditing record manager, wherein the job auditing record manager stores the audit data in a job auditing record.

* * * * *